United States Patent
Blaney et al.

(10) Patent No.: US 9,476,146 B2
(45) Date of Patent: Oct. 25, 2016

(54) POLYMERIC MATERIALS PROVIDING IMPROVED INFRARED EMISSIVITY

(71) Applicant: Clopay Plastic Products Company, Inc., Mason, OH (US)

(72) Inventors: Carol Blaney, Cincinnati, OH (US); Leopoldo V. Cancio, Vero Beach, FL (US); Gregory K. Jones, Lebanon, OH (US)

(73) Assignee: CLOPAY PLASTIC PRODUCTS COMPANY, INC., Mason, OH (US)

( * ) Notice: Subject to any disclaimer, the term of this patent is extended or adjusted under 35 U.S.C. 154(b) by 0 days.

(21) Appl. No.: 14/510,344

(22) Filed: Oct. 9, 2014

(65) Prior Publication Data

US 2016/0076170 A1    Mar. 17, 2016

Related U.S. Application Data

(63) Continuation-in-part of application No. 14/483,827, filed on Sep. 11, 2014, now abandoned.

(51) Int. Cl.

| | |
|---|---|
| *D04H 1/42* | (2012.01) |
| *D01F 6/04* | (2006.01) |
| *D01F 6/06* | (2006.01) |
| *D01F 6/22* | (2006.01) |
| *C08K 3/00* | (2006.01) |
| *D01F 1/10* | (2006.01) |
| *D01D 5/098* | (2006.01) |
| *B32B 5/26* | (2006.01) |
| *B32B 27/18* | (2006.01) |
| *C08J 3/22* | (2006.01) |
| *D01F 8/04* | (2006.01) |

(52) U.S. Cl.
CPC ............ *D01F 1/106* (2013.01); *B32B 5/26* (2013.01); *B32B 27/18* (2013.01); *C08K 3/00* (2013.01); *D01D 5/0985* (2013.01); *C08J 3/22* (2013.01); *D01F 6/04* (2013.01); *D01F 6/06* (2013.01); *D01F 6/22* (2013.01); *D01F 8/04* (2013.01); *D04H 1/42* (2013.01)

(58) Field of Classification Search
CPC .......... B32B 15/14; D01F 6/04; D01F 6/06; D01F 6/22; C08L 23/12; D04H 13/00
See application file for complete search history.

(56) References Cited

U.S. PATENT DOCUMENTS

| | | | |
|---|---|---|---|
| 4,999,243 A * | 3/1991 | Maeda | D01D 5/30 139/420 A |
| 5,192,277 A | 3/1993 | Chung et al. | |
| 5,258,228 A | 11/1993 | Komuro | |
| 5,466,526 A | 11/1995 | Magata | |
| 6,162,535 A | 12/2000 | Turkevich et al. | |
| 6,590,135 B1 | 7/2003 | Lin | |
| 6,755,994 B2 | 6/2004 | Kikuta | |
| 7,687,141 B2 | 3/2010 | Yabuki | |
| 8,338,800 B2 | 12/2012 | Bortz et al. | |
| 8,420,883 B2 | 4/2013 | Elder et al. | |
| 2001/0031957 A1* | 10/2001 | Prestley | A61F 13/49 604/385.25 |
| 2007/0032771 A1* | 2/2007 | Abed | A41B 9/001 604/385.22 |
| 2009/0260541 A1* | 10/2009 | Kragten | C09D 5/031 106/439 |
| 2010/0159773 A1 | 6/2010 | Lai et al. | |
| 2011/0005937 A1 | 1/2011 | Zawacky et al. | |
| 2012/0237752 A1 | 9/2012 | Bortz et al. | |
| 2014/0173981 A1* | 6/2014 | Ichikawa | B32B 5/022 47/58.1 R |

FOREIGN PATENT DOCUMENTS

| | | |
|---|---|---|
| EP | 1291405 A1 | 3/2003 |
| JP | 02145854 A * | 6/1990 |
| JP | 02207720 A * | 8/1990 |
| JP | 2001271218 A | 10/2001 |
| WO | WO 2013022045 A1 * | 2/2013 ............. B32B 5/022 |

OTHER PUBLICATIONS

Derwent Abstract of JP 02-207720 (Acc. No. 1990-294641, Aug. 1990).*
Kafrit (IR Absorbers for AG Films—A Comparative Study. Kafrit Ind. Mar. 2006, 20 pages).*
Cangelosi (Engineered Mineral Fillers for Polyolefin Film Applications. Unimin Corporation. Apr. 14, 2014, 8 pages).*
Derwent Abstract of JP 02-145854 (Acc. No. 1990-214636, Jun. 1990).*
Karian (Chapter 2: Polypropylene: Structure, Properties, Manufacturing Processes, and Applications. Handbook of Polypropylene and Polypropylene Composites. Marcel Dekker, Inc. 2003. pp. 10-33).*
English language translation of JP 02-207720 (Aug. 1990, 11 pages).*
P.M. Woodward et al: "Ferroelectric Tungsten Trioxide", Journal of Solid State Chemistry, vol. 131, No. 1, Jun. 1, 1997, pp. 9-17, XP055223849, US ISSN: 0022-4596, DOI: 10.1006/ jssc.1997.7268 (the whole document).
Fernando P. De La Cruz et al: "Infrared absorption and reflectivity of double perovskite Sr2FeWO6", Solid State Communications, vol. 127, No. 11, Sep. 1, 2003 , pp. 703-706, XP055223835, G B ISSN: 0038-1098, D O I :IO.I016/S0038-1098 (03) 00623-9 (the whole document).
Search Report and Written Opinion from corresponding PCT/US2015/047651, mailed Nov. 4, 2015 (26 pages).

* cited by examiner

*Primary Examiner* — Brieann R Fink
(74) *Attorney, Agent, or Firm* — Thompson Hine LLP

(57) ABSTRACT

IR-emitting or reflecting polymer fibers are formed by blending a high concentration of IR-emitting or reflecting particles with a thermoplastic polymer and meltblowing fibers which have an average diameter of 20 μ or less. The meltblowing process allows for inclusion of a high concentration of the IR-emitting or reflecting particles, yet allows fibers to be formed. These can be formed into a soft, air-permeable, nonwoven web. The fibers can be monocomponent or bicomponent or multicomponent and can be textured or shaped.

21 Claims, No Drawings

POLYMERIC MATERIALS PROVIDING IMPROVED INFRARED EMISSIVITY

FIELD OF INVENTION

The present invention relates to polymeric materials that provide improved infrared (IR) emissivity or other active property. The polymeric materials, including fibrous meltblown webs, comprise IR-emitting particles which may provide health benefits to living tissue in contact with or near the filled polymeric materials.

BACKGROUND OF THE INVENTION

Infrared (IR) radiation is emitted as radiant heat from all physical objects above absolute zero temperature. The ideal example of an IR emitter is a perfect black body which neither reflects nor transmits energy impinging upon it, but rather absorbs all energy impinging upon it, The black body, at steady state, then re-emits this absorbed energy in frequencies dependant on the temperature of that black body. A theoretically perfect black body has an emissivity of 100%, a reflectivity of 0%, and a transmissivity of 0%.

Emitted IR energy has been studied for apparent benefits to living tissue. IR appears to enhance vital biological activity, such as expanding microcapillaries to enhance blood flow, boosting blood oxygen levels, and improving nutrient transport in and out of cells.

There is interest in materials that are close to black bodies in that they can absorb ambient energy from sources such as sunlight, artificial light, body heat, other ambient heat, electromagnetic energy, etc. and then, at steady state, re-emit this energy. Of particular interest are materials that emit IR energy, particularly in the 4 to 14 micron wavelength range of the far infrared spectrum, which is thought to be especially beneficial. Such materials that emit energy in this way may be very beneficial in enhancing healthy biological activity in living tissue. There is evidence, for instance, that packaging materials containing these IR-emitting materials aid in maintaining and lengthening the freshness of foodstuffs such as fresh produce and meat products. There is also evidence that garments, medical devices, blankets, and other such durable goods may enhance the physical health and well-being of living creatures including humans. Such durable goods have been shown to reduce inflammation, enhance blood oxygenation and other natural health-inducing biological functions, and improve performance during physical exertion such as exercise and sports. For these reasons, IR-emitting materials are sometimes described as being 'bio-active' and possessing 'bioactivity.'

Suitable IR-emitting materials come from many sources. Various natural minerals and other inorganic materials have been shown to exhibit IR-emitting properties. Some organic materials also have these properties. It has been found that the IR materials work best when pulverized into fine powders including nano-sized particles, which increases the surface area of the solids. The powders can be applied to the surfaces of base materials, such as fabrics, films or other solid objects. The powders can also be mixed into coatings or paints and applied to the surfaces of solid objects. The powders can also be mixed into a liquid or molten matrix, such as a molten thermoplastic polymer, and then molded into useful objects.

However, these IR-emitting materials have drawbacks. These materials can be difficult to incorporate into consumer goods. As noted above, these materials are most effective when pulverized into fine powders. Incorporating such powders into consumer goods can present challenges. Mineral-based or inorganic IR powders do not have a natural affinity for the organic materials used in most consumer goods. For garments, IR-emitting powders can be sprayed onto the surface of natural fibers, such as cotton, linen, and wool, but these powders can be removed or lost due to abrasion during wear or when washing the garment. Incorporating IR powders into synthetic polymers is feasible. But there is a limit to how much IR powder can be blended into a thin polymer material like a spun fiber or thin film before the polymeric material can no longer be manufactured. For instance, it has been found that inorganic IR-emitting powders can be successfully blended into continuous spunbonded polymeric fibers at concentrations of no more than about 2-5% before the fiber becomes too easily broken during manufacture. It is unclear if garments, drapes, blankets, bandages, and other such consumer goods containing such a low level of IR-emitting powders are as effective in providing the health benefits that these materials promise.

FIR-emitting fabrics in the market today generally include woven and knit fabrics made of spun yarns, and such fabrics have limited bio-activity as described below.

In these knit or woven fabrics, the minimum fiber diameter, as well as the maximum bio-active solids loading, is limited, due to the limitations of the fiber spinning process. For example, in order for the spun fibers not to break, the fiber sizes are typically over about ten microns in diameter, and the bio-active solids loading are no more than ~2-5 wt. percent. If the solids loading is increased above this amount, even when a substantial portion of the particles are sub-micron in size, fibers cannot be spun without breaking. Therefore, there is a need to find a way to increase the solids loading in a fibrous web, so that higher levels of bioactivity can be attained in a soft, breathable and quiet fibrous material. There is also a need to find a way to lower the fiber diameters, which exposes the infrared emitting particles further, increasing both comfort and bioactivity.

Previous solutions to increasing the bioactivity of fibrous webs include making the IR powders as small as possible, which is reported to increase the bioactivity of the materials, as measured by measuring the emissivity of the powder additive or of the bioactive web. However, small particles, when added to a polymer carrier, can cause polymer processing problems, such as particle agglomeration and high viscosity, causing spun fiber breaks and other issues, especially at loadings of over 2-5 percent solids. So there is a practical limit to how small the particles can be, and how much can be added, in spun fibers, as well as a limit to the minimum fiber diameter.

Thus, it is desirable to look at other methods to improve bioactivity that can work in conjunction with making the particles smaller. Such methods include increasing surface area of the fiber and increasing the percent solids. This invention teaches a method to do this by providing a web of fibers with smaller diameters, high solid loadings and optionally with a textured surface.

SUMMARY OF THE INVENTION

The present invention provides an IR-emitting and/or IR-reflecting fiber, formed from a thermoplastic polymer filled with an IR-emitting and/or IR-reflecting material, wherein the fiber has an average diameter of 20 μ, or 10 μ or less, preferably 5 μ or 2 μ or less, and has at least about 10% of said IR material. The fibers are discontinuous randomly formed fibers such as those formed using a meltblowing process.

The IR emitter can be selected from a wide group of IR-emitting compounds, including but not limited to, man-made or naturally occurring, amorphous or crystalline, alumina ($Al_2O_3$), magnesia (MgO), zirconia ($ZrO_2$), titanium dioxide ($TiO_2$), silicon dioxide ($SiO_2$). chromium oxide ($Cr_2O_3$), ferrite ($FeO_2$, $Fe_3O_4$), spinel ($MgOAl_2O_3$), barium oxide (BaO), zinc oxide (ZnO), tin oxide ($SnO_2$), and tungsten trioxide ($WO_3$). Man-made or naturally occurring crystalline minerals, including but not limited to mica, calcite, rock crystal including all colors of quartz, and tourmaline, especially of the black, brown, and blue-green variety, and nepheline syenite, as well as other minerals that have resonance ligands in the infrared range of interest, can be used as IR-emitting powders. In particular, tourmaline, a boron silicate mineral with complex chemical structures, is a mineral oxide with favorable IR-emitting characteristics. In addition, man made bioceramics are included. Bioceramics are are kiln-fired mixtures of metal oxides and/or metals, binders and other additives, which are subsequently pulverized, are also included as high emissivity materials, and are taught for example in US patent application US20060266979A1. Non-oxide ceramics, including but not limited to boron carbide ($B_4C$), silicon carbide (SiC), titanium carbide (TiC), molybdenum carbide (MoC), tungsten carbide (WC), boron nitride (BN), aluminum nitride (AlN), silicon nitride ($Si_3N_4$) and zirconium nitride (ZrN), can also be IR-emitting materials. Non-metallic IR-emitting materials include various forms of carbon structures, including but not limited to activated carbon, carbon nanotubes, bamboo charcoal and other fullerene-rich carbon entities, all with high emissivities. Clays are also included in minerals with high emissivities, and include the four clay groups: kaolin, smectite (includes montmorillonite and saponite), illite (includes mica), and chlorite.

The IR-reflecting materials include but are not limited to metals and metal alloys, including but not limited to silver, gold, tungsten, molybdenum, vanadium, platinum, nickel, copper, nichrome, stainless steel, aluminum, as well as alumel and other metal alloys with high reflectivities. Combinations, mixtures, or blends of the IR-emitting and/or reflecting materials described herein are also contemplated as embodiments of the present invention.

The fibers filled with the IR material can be formed into a nonwoven meltblown web and laminated to a second layer. The first layer of the laminate can be an IR-emitting layer and the second layer of the laminate can be a different material and, in particular, can be an IR reflecting material.

Further, the present invention provides a method of forming an IR-emitting/reflecting fiber comprising melt blowing a thermoplastic polymer-IR particle blend, wherein fibers with average diameters of about 10 μ or less are formed and have a greater than 10% loading of the IR emitting/reflecting material. The method can provide for forming round or shaped mono-component, bi-component or multi-component fibers. These can have core and sheath components wherein the core contains little or no IR material and the sheath contains a large percentage of IR material. Alternately, different IR materials can be contained in the core and the sheath. Further, the formed fibers can be textured if desired. The objects and advantages of the present invention will be further appreciated in light of the detailed description.

DETAILED DESCRIPTION

For the purpose of this disclosure, the following terms are defined:

"Fiber" refers to a material in a thread-like form where the dimension of the material in the x (length) direction is substantially larger than the dimension in the y (width) and z (thickness) directions. Fibers may be solid throughout, or they may contain hollow areas, such as cells, bubbles or tubes. Staple fibers may be relatively short, with a length (x dimension) of about 2-100 min. Fibers typically have y and z dimensions that are less than an order of magnitude different, and these dimensions are in the range of about 0.1 μm to about 1 mm. For instance, a typical fiber may be roughly circular in cross section, with a diameter (y and z dimensions) of about 15 μm; alternatively, a typical fiber with an oval or oblong cross-section might have a width (y dimension) of about 20 μm but a thickness (z direction) of about 5 μm.

"Bicomponent fiber" refers to a fiber that comprises two distinctly different polymeric components that are simultaneously extruded to form the fiber, but the components remain essentially separate and unmixed within the structure of the fiber. Bicomponent fibers are therefore somewhat comparable to coextruded multilayer polymer films. Typical cross-sectional structures of bicomponent fibers include sheath/core, side-by-side, islands-in-the-sea, pie or orange structures.

"Multicomponent fiber" refers to a fiber that is similar to a bicomponent fiber but comprises three or more distinctly different polymeric components. For the purpose of this disclosure, any statement regarding bicomponent fibers should be reasonably understood to encompass multicomponent fibers as well.

"Nano-sized" refers to anything with a dimension under one micron.

"IR-emitting powder" refers to any material that is capable of absorbing ambient energy at limited or broad ranges of the spectrum, including but not limited to radiation in the microwave, infrared, visible, or ultraviolet ranges of the spectrum, then re-emitting some or all of that energy in the infrared range of the spectrum. IR-emitting materials can be mined as naturally-occurring minerals or can be synthesized, then manufactured into powders through pulverization, grinding, precipitation from solution, crystallization, or other such processes.

Likewise, IR-reflecting materials do not absorb IR but instead they reflect IR.

"Laminate" as a noun refers to a layered structure of sheet-like materials stacked and bonded so that the layers are substantially coextensive across the width of the narrowest sheet of material. The layers may comprise films, bonded or unbonded nonwovens, woven fabrics, or other materials in sheet form, or combinations thereof For instance, a laminate may be a structure comprising one or more layers of film and one or more layers of fibers bonded together across their width such that the layers remain bonded as a single sheet under normal use. A laminate may also be called a composite or a coated material. "Laminate" as a verb refers to the process by which such a layered structure is formed.

"Effective emissivity" expresses the quantity of photons, specifically infrared photons in the 2-20, or more preferably in the 4-15 micron wavelength range of the spectrum that are emitted from the film, fabric, or laminate material, as a percentage of the total radiant energy impinging upon the material.

For the present invention, an IR-emitting/reflecting powder is incorporated into a polymeric matrix to form polymeric fibers. The IR-emitting powder of the present invention should comprise a material with an IR emissivity (in the 4-15 micron wavelength range, and especially in the 8-11 wavelength range) of at least about 50%, preferably at least about 65%, more preferably at least about 75%, more preferably at least about 85%. IR-emitting powders can comprise many inorganic and organic materials. Many metal oxides can be used as IR-emitting powders. Examples of such metal oxides include, but are not limited to, alumina ($Al_2O_3$), magnesia (MgO), zirconia ($ZrO_2$), titanium dioxide ($TiO_2$), silicon dioxide ($SiO_2$), chromium oxide ($Cr_2O_3$), ferrite ($FeO_2$, $Fe_3O_4$), spinel ($MgOAl_2O_3$), barium oxide (BaO), zinc oxide (ZnO), tin oxide ($SnO_2$), and tungsten trioxide ($WO_3$). Crystalline minerals, including but not limited to mica, calcite, rock crystal and tourmaline, and nepheline syenite can be used as IR-emitting powders. In particular, tourmaline, a boron silicate mineral with complex chemical structures, is a mineral oxide with favorable IR-emitting characteristics. Non-oxide ceramics, including but not limited to boron carbide ($B_4C$), silicon carbide (SiC), titanium carbide (TiC), molybdenum carbide (MoC), tungsten carbide (WC), boron nitride (BN), aluminum nitride (AlN), silicon nitride ($Si_3N_4$) and zirconium nitride (ZrN), can also be IR-emitting materials. Non-metallic IR-emitting materials include activated carbon, carbon nanotubes, bamboo charcoal and other fullerene-rich materials. Metals and metal alloys, including but not limited to tungsten, molybdenum, vanadium, platinum, nickel, copper, nichrome, stainless steel, and alumel, can also be used as IR-emitting powders. Combinations, mixtures, or blends of the IR-emitting materials described herein are also contemplated as embodiments of the present invention.

As previously stated, the IR powder must be a fine powder for the purposes of the present invention. Suitable particle sizes for these powders include particles ranging from about 10 nm to about 10 μ, generally 100 nm or to 5 μ.

The polymers used as the matrix materials for the present invention include any extrudable thermoplastic polymer. Suitable polymers for the polymeric matrix materials include, but are not limited to, polyolefins, for example, polyethylene homopolymers and copolymers, and polypropylene homopolymers and copolymers, functionalized polyolefins, polyesters, poly(ethylene oxides), poly(ester-ethers), polyamides, including nylons, poly(ether-amides), polyacrylates, polyacrylonitrile, polyvinyl chloride, polyether sulfones, fluoropolymers, polyurethanes, styrenic block copolymers, and the like. Polyethylene homopolymers include those of low, medium or high density and/or those formed by high pressure or low pressure polymerization. Polyethylene and polypropylene copolymers include, but are not limited to, copolymers with $C_4$-$C_8$ alpha-olefin monomers, including 1-octene, 1-butene, 1-hexene and 4-methyl pentene. The polyethylene may be substantially linear or branched, and may be formed by various processes known in the art using catalysts such as Ziegler-Natta catalysts, metallocene or single-site catalysts or others widely known in the art. Examples of suitable copolymers include, but are not limited to, copolymers such as poly(ethylene-butene), poly(ethylene-hexene), poly(ethylene-octene), and poly(ethylene-propylene), poly(ethylene-vinylacetate), poly(ethylene-methylacrylate), poly(ethylene-acrylic acid), poly(ethylene-butylacrylate), poly(ethylene-propylenediene), and/or polyolefin terpolymers thereof. Suitable polyesters include polyethylene terephthalate. Suitable polyamides include nylon 6, nylon 6,6, and nylon 6,12. Styrenic block copolymers include styrene-butadiene-styrene (SBS), styrene-isoprene-styrene (SIS), styrene-ethylenebutylene-styrene (SEBS), styrene-ethylenepropylene-styrene (SEPS), and other similar polymers.

The thermoplastic polymers are combined with the desired concentration of the IR power by melt blending. Typically, polymers used to form meltblown fibers have a high melt flow rate. The higher the melt flow rate, generally the easier it is to form the fibers. The polymer powder blend used in the present invention will generally have a melt flow rate high enough to permit formation of meltblown fibers. Generally, this can be 550 or greater, and preferably over 600, and most desirable is a MFR of 700 or higher.

When mono-component fibers are formed, the concentration by weight of IR powder in the polymer powder blend can be maximized to maximize the IR-emitting/reflecting properties of the formed fiber. The concentration can be as low as 10% by weight but, for use in the present invention, will generally be 15% by weight or more, and can be 20% by weight, 25% by weight, 30% by weight and even higher, provided the polymer powder blend has a sufficiently high melt flow rate to permit its use in the formation of meltblown fibers.

For bicomponent or multicomponent fibers, the fiber component containing the IR powder can constitute up to about 50% of the total bicomponent fiber structure, with the other fiber component(s) (which may or may not contain a different IR powder) constituting the remaining percentage of the total fiber structure.

Increasing the surface area of the polymeric fibers can increase the IR emissivity of the material. By increasing the active surface area of the fiber, there is more area to capture and absorb impinging radiation, thereby increasing the opportunity for the IR-emitting powder particles to encounter and absorb the impinging radiation, then convert and re-emit that energy as photons in the IR spectrum. The IR powder may be incorporated throughout the fibers with increased surface area, or the powder may be incorporated into one or more components of a bicomponent or multicomponent fiber structure with increased surface area.

Meltblown fibers of the present invention are formed by extruding a molten thermoplastic material through a plurality of fine, usually circular, die capillaries as molten threads or filaments into a high velocity stream of heated gas, usually air, which attenuates the filaments of molten thermoplastic material to reduce their diameter. Thereafter, the meltblown fibers are carried by the high velocity gas stream and deposited as discontinuous random fibers on a collecting surface to form a web of randomly disbursed meltblown fibers. Meltblowing is generally described, for example, in U.S. Pat. No. 3,849,241 to Buntin, U.S. Pat. No. 4,307,143 to Meitner, et al., and U.S. Pat. No. 4,707,398 to Boggs, each of which is incorporated herein by reference.

The meltblown fibers of the present invention can be formed with any typical meltblown fiber apparatus. They can also be formed by similar methods, such as two phase flow spinning, commonly referred to as the Verdex process. The extrusion temperature, die temperature, flow rate of polymer and process air temperature and air flow rates are simply varied to accommodate the particular polymer, as well as the polymer powder blend used in the present invention. The present invention will be further appreciated in light of the following detailed example.

EXAMPLE 1

A master batch with a high MFR was formed containing 20% (0.3-0.4 μ) titanium dioxide particles, and polypropylene. The master batch containing the 20% titanium dioxide particles had a melt flow rate of 700. Initially, a comparative "control" batch of 100% polypropylene was formed into fibers using a meltblown process, and a substantial portion of the fibers were sub-micron sized. Subsequently, 5% of the master batch was blended with 95% of high MFR polypropylene. These also easily formed nano fibers. Subsequent webs were made with 10, 20, 50% and 100% of the master batch. All produced meltblown fiber webs. There was a gradual increase in pressure drop across the screen pack (200 PSI pressure drop across screen pack with 100% of the straight polypropylene, gradually reaching a 525 PSI drop with 100% master batch, which is well within safe and normal limits). The extruder temperatures were 200-240° C.; die temperature 241° C., and process air temperatures at two zones range from 315-242° C. The control and the 20% solids webs were subsequently analyzed with SEM. These tests confirmed good formation, high solids content, and a significant portion of nano sized fibers.

EXAMPLE 2

A master batch with a high MFR was formed containing 15 weight percent (2-5 μ) nepheline syenite with polypropylene. The MFR was 759. Initially, a control batch of 100% polypropylene was tested, forming meltblown fibers. Subsequently, the master batch was blended half-and-half with polypropylene, resulting in a powder/polymer blend with 7.5% solids. This formed meltblown fibers providing a web which was soft and free of shot. The process conditions were similar to those in Example 1, with minor adjustments made as needed to produce a good web. A subsequent web was formed with 100% master batch, forming a web that was 15% solids with excellent formation and no shot.

Once the inventive IR-emitting/reflective fibers are formed, they may be further processed, or laminated onto, films, fabrics or other fibrous webs. These fabrics or other fibrous webs may be made entirely of the inventive fibers, or the inventive fibers may be mixed with traditional fibers in order to create fabrics with the desired physical and aesthetic properties. For durable goods, the inventive fibers can be subsequently spun into yarns (as wool is spun into multi-stranded fibers), and then woven or knitted into fabrics that can then be used to fashion garments, protective outer wear, blankets, or other such end-use products. For limited-use or disposable goods, it may be desirable to form nonwoven fabrics from the inventive fibers. Methods of making woven, knitted, and nonwoven fabrics are well known in the art.

The present invention is particularly suited for forming multilayer fibrous laminates. According to the present invention, a first layer containing an IR-emitting powder, such as the nepheline syenite, could be formed onto a second layer which contains an IR-reflecting powder, such as aluminum powder, Thus, when the first IR emitting layer is placed against the skin, the IR emitted from the first layer in the direction away from the skin is reflected back by the second layer, so that the net result is that the infrared is emitted substantially in the direction towards the skin, in one direction. This can be used, for example, in insulation wherein the IR-emitting material is adjacent the skin, and leaving the IR reflective layer away from skin. Other IR reflective layers can be used in lieu of the filled, IR-reflective fibrous layer, such as a metalized film, a metalized fibrous web, or the like. A further embodiment incorporates a third fibrous layer between the IR-reflective layer and the IR-emitting layer. This (less costly) layer can be formed without any powder, and provides an insulation layer that hinders conductive and convective heat transfer. A good material for this would be the comparative 'control' meltblown described in Example 1, comprising a polypropylene meltblown web with a substantial portion of the fibers being nano-sized.

The inventive material, particularly fibrous meltblown webs may be laminated to a substrate layer by known lamination means. These lamination means include extrusion lamination, adhesive lamination, thermal bonding, ultrasonic bonding, calendar bonding and other such means. Combinations of these bonding methods are also within the scope of the present invention. The substrate layer can be any extensible sheet-like material, such as another fabric, another polymer film, or paper. A particularly useful laminate is a heat-insulating, and bioactive material, comprising both an IR-emitting meltblown web and an IR reflecting web or film.

The webs and laminates of the present invention can be used in a wide variety of applications, including garments, hygiene, surgical, food, agricultural, construction, outdoors, transportation and other applications. Some exemplary applications include:

Garment components used in various manufactured garments, including outerwear, sportswear, post-workout recovery wear, leisure wear, undergarments, military and NASA garments, boot or shoe liners, inserts, socks, gloves, hats, scarves, shawls, wraps, headbands, thermal underwear, compression wear, shapewear, industrial wear, post-operative wear, and garment components such as interfacing for cuffs, collars, belts, and the like.

Hygiene article components, including all manner of diapers and incontinent wear, premature infant diapers and articles, nursing pads, feminine care articles, inserts for underwear for men or women, hygiene components such as coversheet, top sheet, transfer layer and other layers within the products, elastic ears, side panels.

Medical components of hospital/medical products such as all manner of disposable, limited use, or durable garments such as gowns, booties, headwraps and the like, as well as products such as bed pads, mattress pads and the like, blankets, surgical and post-surgical drapes, post-X-ray garments, wraps, or inserts, as well as components of bandages of all types (elastic, compression, wound care and healing, post workout, acute care, disposable adhesive bandages and the like, and especially as an absorbent wound pad component), medical and kinesiology tape components, drug delivery patch, as well as new products such as bra inserts for post-mammogram treatment, and bra inserts for chemotherapy-related complimentary treatments, as well as new products such as underwear or underwear inserts for a (drug free) substitute for erectile dysfunction drugs.

Surgical component in a "fresh-keeping" storage system for various types of human and animal transplant components, for enhancing the health and life of these components during transport and before transplantation.

Pet/animal care components of pet and animal care products such as bedding, wraps, bed and chair liners and the like, compression wraps especially for equine use.

Food industry component in a fresh-keeping storage system, absorbent pad system, packaging system and the like, for various types of meat, and also for greens, vegetables, berries, fruits, or other living foods.

Agriculture components, seedling wrap to speed/enhance growth, hydroponic plant wrap or drape to enhance flavor development in hydroponic plant environments (such as, for example, tomatoes, known to be flavorless otherwise).

Outdoor components, outdoor gear such as insulation for tents, camping gear, sleeping bags, emergency blankets, and the like.

Building/construction components, building materials such as insulation, house wrap, underlayment, carpet and flooring, curtains, wallpaper, components of tiles and mats.

Transportation components, such as upholstery, insulation, steering wheel wraps/covers, floor mats, armrests, headrests, in all manner of the transportation industry (auto, air, boat, or mass transit usage, and the like).

Other components, such as meditation mat components, mouse pad components, furniture and upholstery components.

This has been a description of the present invention along with the preferred method of practicing the present invention. However, the invention itself should only be defined by the appended claims.

Wherein we claim:

1. A nonwoven web comprising mono-component meltblown polymeric fibers, said polymeric fibers comprising at least one polymer and at least about 10% of an IR-emitting material, wherein the IR-emitting material has an emissivity of at least about 50% in the range of from about 4 µm to about 15 µm.

2. The nonwoven web of claim 1, wherein the IR-emitting material is a crystalline mineral.

3. The nonwoven web of claim 2, wherein the crystalline mineral is tourmaline.

4. The nonwoven web of claim 2, wherein the crystalline mineral is nepheline syenite.

5. The nonwoven web of claim 1, wherein the IR-emitting material is a non-metallic IR-emitting material.

6. The nonwoven web of claim 5, wherein the non-metallic IR-emitting material is selected from h group consisting of activated carbon, carbon nanotubes, bamboo charcoal, and combinations thereof.

7. The nonwoven web of claim 5, wherein the non-metallic IR-emitting material is bamboo charcoal.

8. The nonwoven web of claim 1, wherein the IR-emitting material has an emissivity of at least about 50% in the range of from about 8 µm to about 11 µm.

9. The nonwoven web of claim 1, wherein the IR-emitting material has a particle size of from about 10 nm to about 10 µm.

10. The nonwoven web of claim 1, wherein the meltblown polymeric fibers comprise at least about 20% of the IR-emitting material.

11. The nonwoven web of claim 1, wherein the meltblown polymeric fibers comprise at least about 50% of the nonwoven web.

12. The nonwoven web of claim 1, wherein the meltblown polymeric fibers have an average diameter of less than about 10 µm.

13. The nonwoven web of claim 1, wherein the polymer comprises polyethylene, polypropylene, homopolymers, copolymers, or combinations thereof.

14. The nonwoven web of claim 1, wherein the polymer comprises one or more styrenic block copolymers.

15. A laminate comprising a nonwoven web and at least one substrate, wherein said nonwoven web comprises mono-component meltblown polymeric fibers, said meltblown polymeric fibers comprising at least one polymer and at least about 10% of an IR-emitting material, wherein the IR-emitting material has an emissivity of at least about 50% in the range of from about 4 µm to about 15 µm.

16. The laminate of claim 15, wherein the substrate comprises a fabric, a polymeric film, paper, or any combination thereof.

17. The laminate of claim 15, wherein the substrate comprises an IR-reflective film.

18. The laminate of claim 15, wherein the IR-emitting material is nepheline syenite.

19. The laminate of claim 15, wherein the IR-emitting material is tourmaline.

20. The laminate of claim 15, wherein the IR-emitting material is bamboo charcoal.

21. An article of manufacture comprising a laminate, said laminate comprising a nonwoven web and at least one substrate, wherein said nonwoven web comprises mono-component meltblown polymeric fibers comprising at least one polymer and at least about 10% of an IR-emitting material, wherein the IR-emitting material has an emissivity of at least about 50% in the range of from about 4 µm to about 15 µm.

* * * * *